US009245581B2

(12) United States Patent
Tanaka et al.

(10) Patent No.: US 9,245,581 B2
(45) Date of Patent: Jan. 26, 2016

(54) MAGNETIC HEAD PROVIDING WRITE PROTRUSION SUPPRESSION AND METHODS OF FORMATION THEREOF

(71) Applicant: HGST Netherlands B.V., Amsterdam (NL)

(72) Inventors: Koji Tanaka, Odawara (JP); Yoshinori Takeuchi, Ishioka (JP)

(73) Assignee: HGST Netherlands B.V., Amsterdam (NL)

(*) Notice: Subject to any disclaimer, the term of this patent is extended or adjusted under 35 U.S.C. 154(b) by 0 days.

(21) Appl. No.: 13/915,539

(22) Filed: Jun. 11, 2013

(65) Prior Publication Data
US 2014/0362674 A1 Dec. 11, 2014

(51) Int. Cl.
| G11B 11/00 | (2006.01) |
| G11B 21/12 | (2006.01) |
| G11B 5/127 | (2006.01) |
| G11B 5/31 | (2006.01) |
| G11B 5/60 | (2006.01) |
| G11B 5/00 | (2006.01) |

(52) U.S. Cl.
CPC .............. G11B 21/12 (2013.01); G11B 5/1278 (2013.01); G11B 5/314 (2013.01); G11B 5/3136 (2013.01); G11B 5/607 (2013.01); G11B 5/6088 (2013.01); G11B 11/00 (2013.01); *G11B 2005/0021* (2013.01); *Y10T 29/49021* (2015.01)

(58) Field of Classification Search
CPC .......... G11B 5/40; G11B 21/12; G11B 13/04; G11B 11/00
USPC .................. 360/125.32, 59; 369/13.17, 13.13, 369/13.33; 29/603.01
See application file for complete search history.

(56) References Cited

U.S. PATENT DOCUMENTS

| 6,876,526 B2 | 4/2005 | Macken et al. |
| 7,133,254 B2 | 11/2006 | Hamann et al. |
| 7,262,936 B2 | 8/2007 | Hamann et al. |

(Continued)

FOREIGN PATENT DOCUMENTS

| JP | 11126312 A | 5/1999 |
| JP | 2010118094 A | 5/2010 |
| JP | 2011118973 A | 6/2011 |

OTHER PUBLICATIONS

Nakada et al., "Nano-Scale Simulation Technologies," Fujitsu Science Technical Journal, vol. 42, No. 1, Jan. 2006, pp. 103-112.

(Continued)

*Primary Examiner* — Angel Castro
(74) *Attorney, Agent, or Firm* — Zilka-Kotab, PC

(57) ABSTRACT

A system includes a magnetic head, a magnetic medium, a drive mechanism for passing the magnetic medium over the magnetic head, and a controller electrically coupled to the magnetic head for controlling operation of the magnetic head, wherein the magnetic head has a write element, a read element, a substrate that is an alloy material having greater than about 50 at. % TiC, and a heater element positioned between the read element and the write element, the write element being positioned nearer to the substrate than the read element such that heat generated by the write element during write operations is dissipated by the substrate, and the heater element being adapted for inducing protrusion of portions of an air bearing surface (ABS) of the magnetic head to adjust a clearance between the portions of the ABS and the magnetic medium.

21 Claims, 17 Drawing Sheets

(56) References Cited

U.S. PATENT DOCUMENTS

| | | | |
|---|---|---|---|
| 7,324,306 B2 | 1/2008 | Ruiz | |
| 7,440,220 B1 * | 10/2008 | Kang et al. | 360/75 |
| 7,969,826 B2 | 6/2011 | Naniwa et al. | |
| 8,094,418 B2 | 1/2012 | Schreck et al. | |
| 8,169,881 B2 | 5/2012 | Balamane et al. | |
| 8,406,093 B2 * | 3/2013 | Iwanabe et al. | 369/13.33 |
| 8,456,965 B2 | 6/2013 | Naniwa et al. | |
| 8,619,511 B1 * | 12/2013 | Iwanabe | 369/13.24 |
| 2004/0037003 A1 * | 2/2004 | Tsubota et al. | 360/126 |
| 2004/0257711 A1 * | 12/2004 | Ushiyama et al. | 360/317 |
| 2008/0218891 A1 * | 9/2008 | Gubbins et al. | 360/59 |
| 2010/0103556 A1 * | 4/2010 | Suzuki et al. | 360/97.02 |
| 2010/0118439 A1 | 5/2010 | Aoki | |
| 2010/0232050 A1 | 9/2010 | Schreck et al. | |
| 2011/0128828 A1 | 6/2011 | Naniwa et al. | |
| 2014/0241138 A1 * | 8/2014 | Hirata et al. | 369/13.33 |

OTHER PUBLICATIONS

Zheng et al., "Investigation of Flying-Height Stability of Thermal Fly-Height Control Sliders in Lubricant or Solid Contact with Roughness," Tribol Lett, vol. 38, 2010, pp. 283-289.

Office Action from Chinese Application No. 2014-119386, dated Feb. 24, 2015.

* cited by examiner

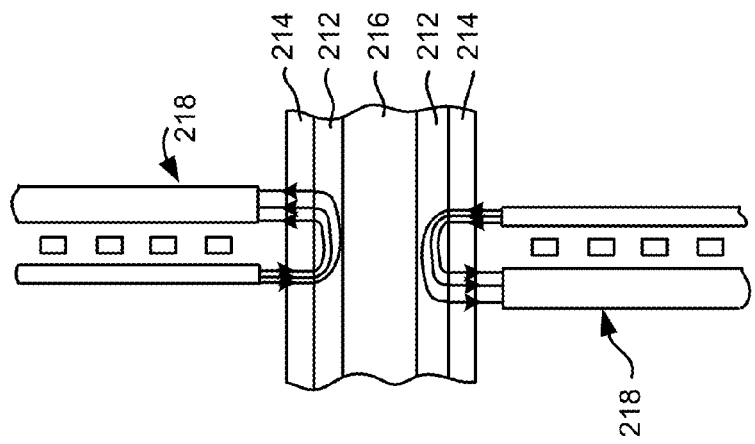
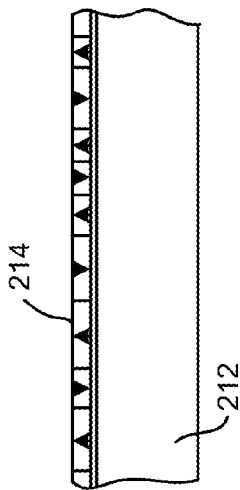
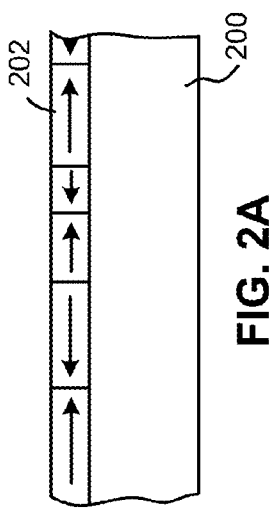
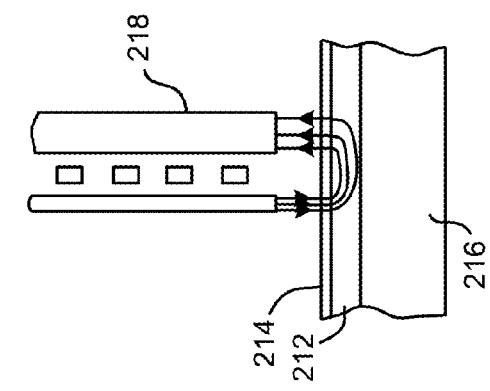
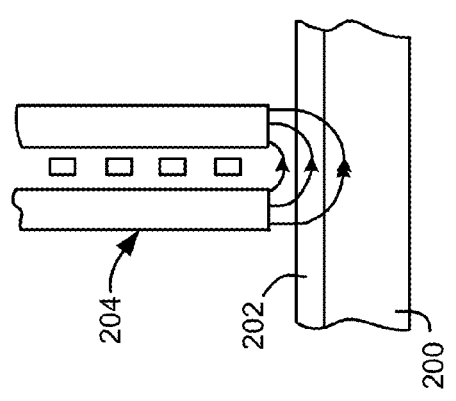

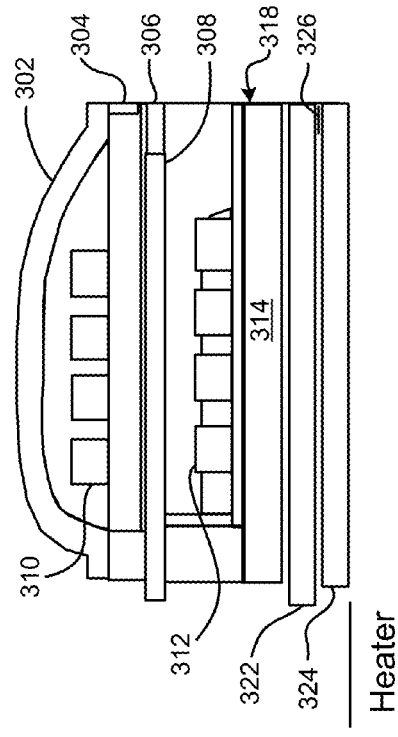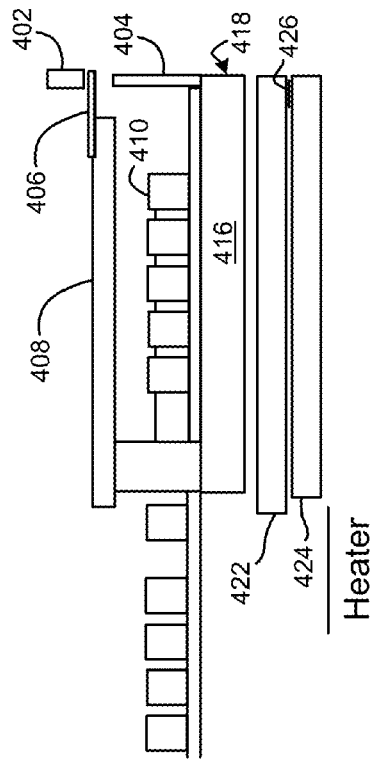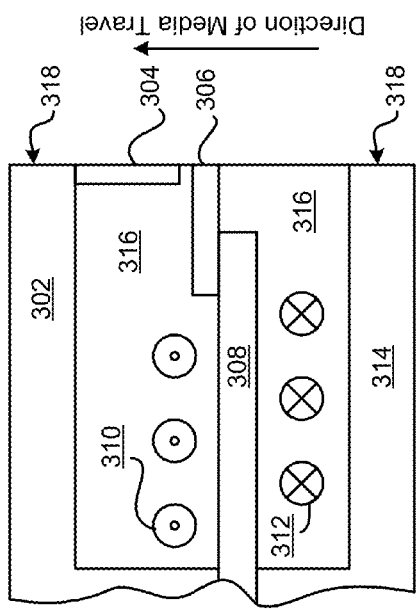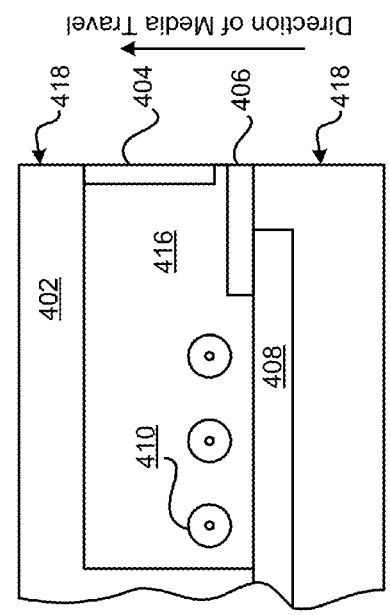

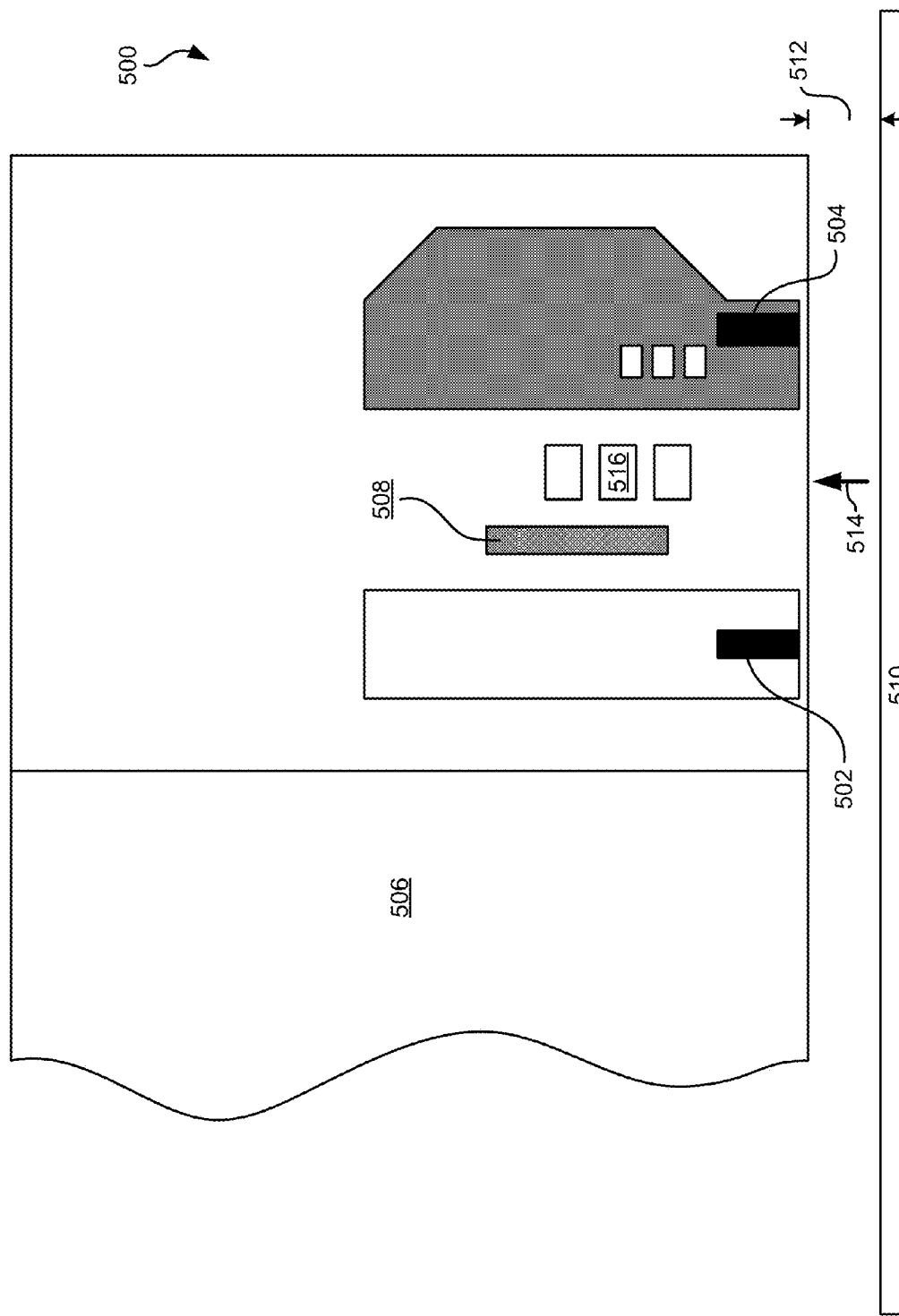

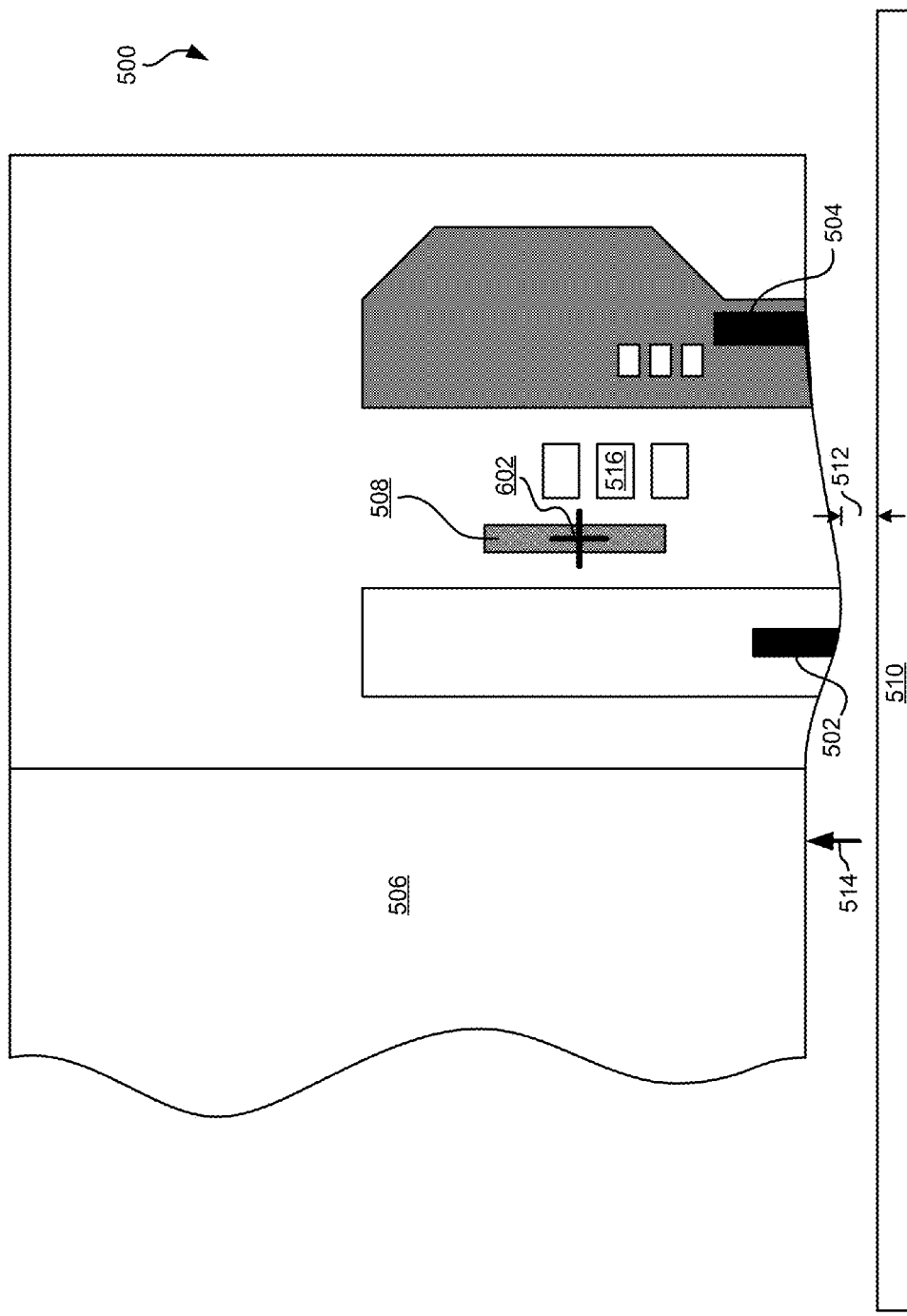

MAGNETIC HEAD PROVIDING WRITE PROTRUSION SUPPRESSION AND METHODS OF FORMATION THEREOF

FIELD OF THE INVENTION

The present invention relates to a structure of a magnetic head, and more particularly, this invention relates to a magnetic head used in a magnetic disk drive that utilizes thermal flying-height control by way of thermal expansion.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. FIG. 5 schematically shows a structure of a magnetic head 500 which performs conventional thermal flying-height control (TFC), according to the prior art. A read element 502 and a write element 504 are formed in succession on a substrate 506. A heater element 508 which is activated in order to perform TFC may be placed between the substrate 506 and the read element 502, between a write coil 516 and the read element 502, between the read element 502 and the write element 504, etc. In FIG. 5, this heater element 508 is shown positioned between the read element 502 and the write element 504, but is not so limited.

During TFC, the gap or clearance 512 between the recording medium 510 and the air bearing surface (ABS) 514 of the magnetic head 500 (typically one of the write element 504 and the read element 502) is controlled by applying more or less heat from the heater element 508, such as by controlling the current, power, or energy supplied to the heater element 508, and utilizing thermal expansion of materials near the heater element 508 caused by heat produced by the heater element 508 to cause enlargement of an area of the magnetic head 500 at the ABS 514.

FIGS. 6A-6B schematically show the TFC clearance 512 during operation of a magnetic disk drive that utilizes the magnetic disk 500. During a read operation, as shown in FIG. 6A, thermal expansion takes place due to heat generated by the read element 502. It has been confirmed by experimentation and heat deformation calculations that clearance fluctuations do not occur. The clearance 512 during a read operation is controlled by causing deformation of the ABS 514 due to thermal expansion caused by the heat generation near a center (denoted by cross 602) of the heater element 508. Setting the clearance 512 during a read operation at a predetermined amount ensures stability of the recording and reproduction characteristics of the magnetic disk drive and guards against deterioration in reliability of the magnetic head 500 due to contact ("touchdown") between the magnetic head 500 and the disk medium 510.

When the clearance 512 is set for a read operation, the clearance 512 during a write operation, as shown in FIG. 6B, may also be set to any amount according to the placement and shape of the heater element 508.

On the other hand, when the magnetic disk drive is performing a write operation, the heat generated by the write element 504 produces clearance fluctuations (referred to below as "write protrusion") because of thermal expansion caused by heat generated near a center (denoted by cross 604) of the write element 504 (this heat is also near the coil 516). Therefore, the shape produced as a result of thermal expansion during write operations, as shown in FIG. 6B, differs from a shape produced during read operations, as shown in FIG. 6A. It is therefore useful to implement TFC to account for write protrusion that is different from read protrusion when the magnetic disk is performing write operations.

However, there is a need to record to magnetic disk media having a high coercive force because of increased recording density in typical magnetic disk media. Consequently, the current used for a write operation has increased over time and taken a higher frequency due to an increase in the write signal output. This results in the heat generated by the write element during a write operation to similarly increase, with write protrusion becoming larger. Furthermore, write protrusion varies according to specific write signals. For example, the write signal frequency is different at an inner circumference of the disk medium as compared to an outer circumference of the disk medium, with write protrusion also varying. Therefore, it would be useful to account for this variation in TFC.

SUMMARY

In one embodiment, a magnetic head includes a write element, a read element, and a substrate capable of dissipating heat, wherein the write element is positioned nearer to the substrate than the read element such that heat generated by the write element during write operations is dissipated by the substrate.

In another embodiment, a system includes at least one magnetic head, a magnetic medium, a drive mechanism for passing the magnetic medium over the at least one magnetic head, and a controller electrically coupled to the at least one magnetic head for controlling operation of the at least one magnetic head, wherein each magnetic head has a write element, a read element, a substrate that is an alloy material having greater than about 50 at. % TiC, and a heater element positioned between the read element and the write element, wherein the write element is positioned nearer to the substrate than the read element such that heat generated by the write element during write operations is dissipated by the substrate, and wherein the heater element is adapted for inducing protrusion of portions of an air bearing surface (ABS) of the magnetic head to adjust a clearance between the portions of the ABS and the magnetic medium.

In yet another embodiment, a method for forming a magnetic head includes forming a write element above a substrate and forming a read element above the write element, wherein the substrate includes a material capable of dissipating heat.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIG. 5 shows a magnetic head which performs conventional thermal flying-height control (TFC), according to the prior art.

FIGS. 6A-6B show TFC clearance during operation of a magnetic disk drive, according to the prior art.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic head includes a write element, a read element, and a substrate capable of dissipating heat, wherein the write element is positioned nearer to the substrate than the read element such that heat generated by the write element during write operations is dissipated by the substrate.

In another general embodiment, a system includes at least one magnetic head, a magnetic medium, a drive mechanism for passing the magnetic medium over the at least one magnetic head, and a controller electrically coupled to the at least one magnetic head for controlling operation of the at least one magnetic head, wherein each magnetic head has a write element, a read element, a substrate that is an alloy material having greater than about 50 at. % TiC, and a heater element positioned between the read element and the write element, wherein the write element is positioned nearer to the substrate than the read element such that heat generated by the write element during write operations is dissipated by the substrate, and wherein the heater element is adapted for inducing protrusion of portions of an air bearing surface (ABS) of the magnetic head to adjust a clearance between the portions of the ABS and the magnetic medium.

In yet another general embodiment, a method for forming a magnetic head includes forming a write element above a substrate and forming a read element above the write element, wherein the substrate includes a material capable of dissipating heat.

Figure 1:
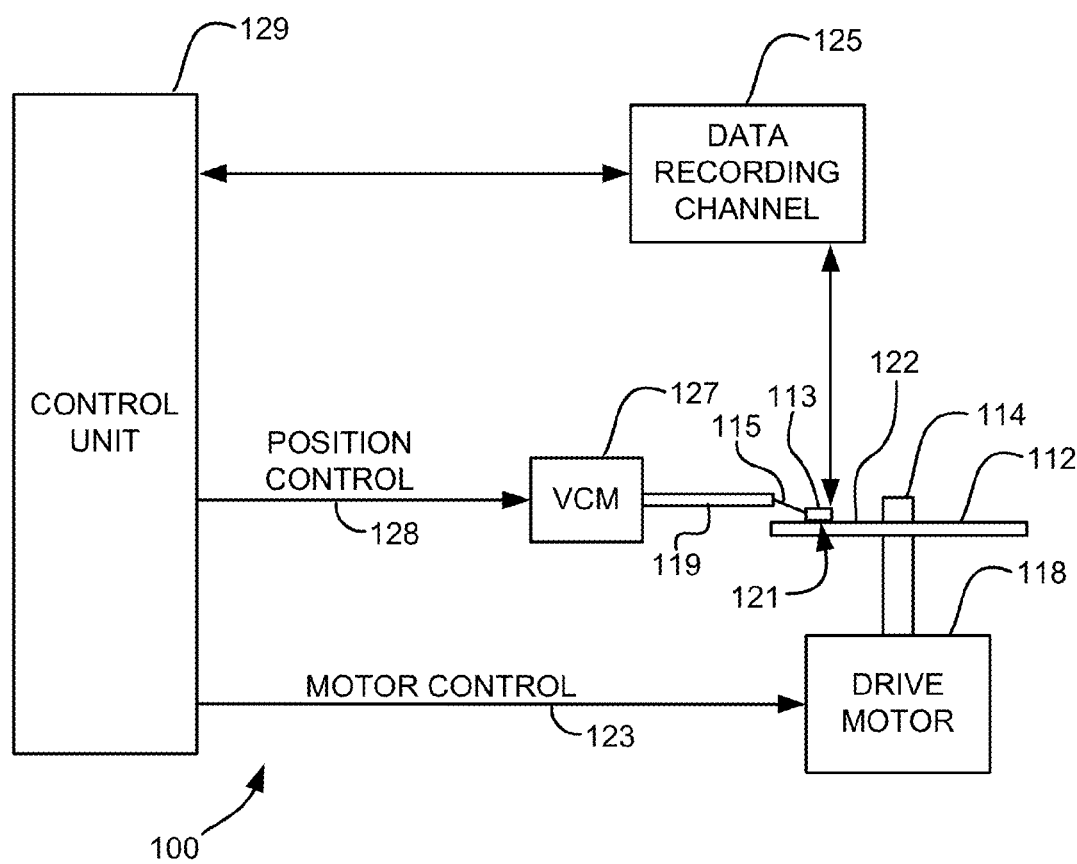
FIG. 1 is a simplified drawing of a magnetic recording disk drive system.
Figure 6B:
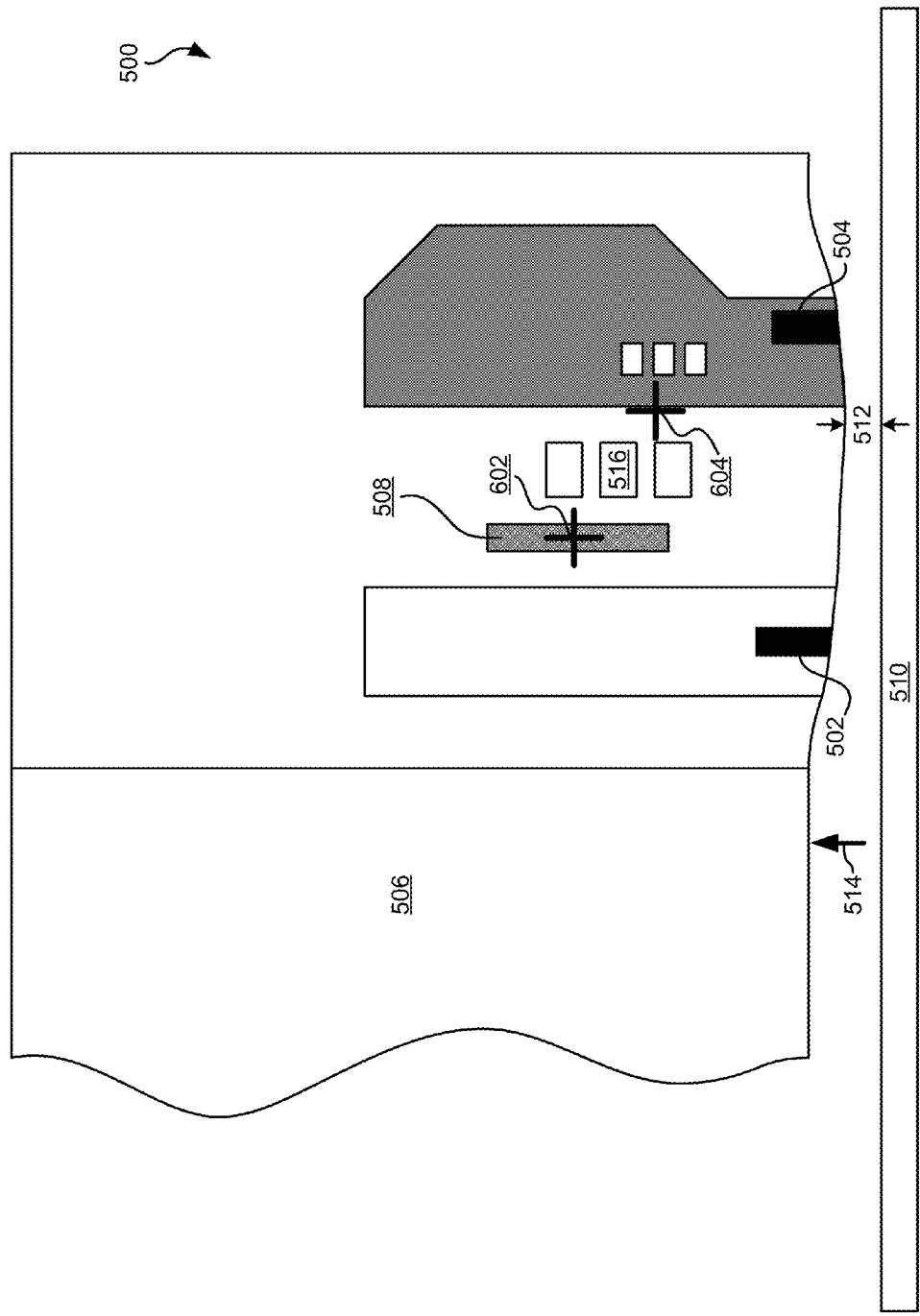

Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism, which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write portions 121. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider.

The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (internal or external) to send and receive the data and for controlling the operation of the disk drive and communicating the status of the disk drive to the host, all as will be understood by those of skill in the art.

In a typical head, an inductive write portion includes a coil layer embedded in one or more insulation layers (insulation stack), the insulation stack being located between first and second pole piece layers. A gap is formed between the first and second pole piece layers by a gap layer at an ABS of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater element (Heater) may also be included in the magnetic heads shown in FIGS. 3A and 4A. The position of this heater element may vary based on design parameters such as where the protrusion is desired, coefficients of thermal expansion of the surrounding layers, etc.

According to a first embodiment, a magnetic head in which write protrusion is suppressed by causing the heat generated by a write element during a write operation to be transferred or deflected to a substrate, which may comprise TiC or an alloy thereof, such as AlTiC. In one approach, the write protrusion may be caused at least partially by heat generated by the write element during a write operation.

In a second embodiment, the magnetic head as described above may be controlled such that a clearance between an ABS of the magnetic head and a magnetic disk medium (TFC) is controlled via thermal expansion caused by heat of a heater element.

In a third embodiment, in a magnetic head utilizing a thermal assist structure for suppressing write protrusion, write protrusion may be suppressed by causing heat generated by a laser light guide and a near field light generating element (near field transducer) to be transferred onto a substrate, such as a substrate comprising TiC or an alloy thereof, such as AlTiC.

In any of the embodiments described herein, the read element, write element, heater element, laser light guide, near field transducer, and any other elements and structures of the various magnetic heads may be formed according to any suitable fabrication techniques known in the art, such as sputtering, plating, ion deposition, plasma deposition, etching, and/or combinations thereof. Furthermore, the materials of construction for any of the elements and structures of the various magnetic heads described herein may be chosen to perform conventional operations of the respective components, as would be understood by one of skill in the art.

Figure 7:
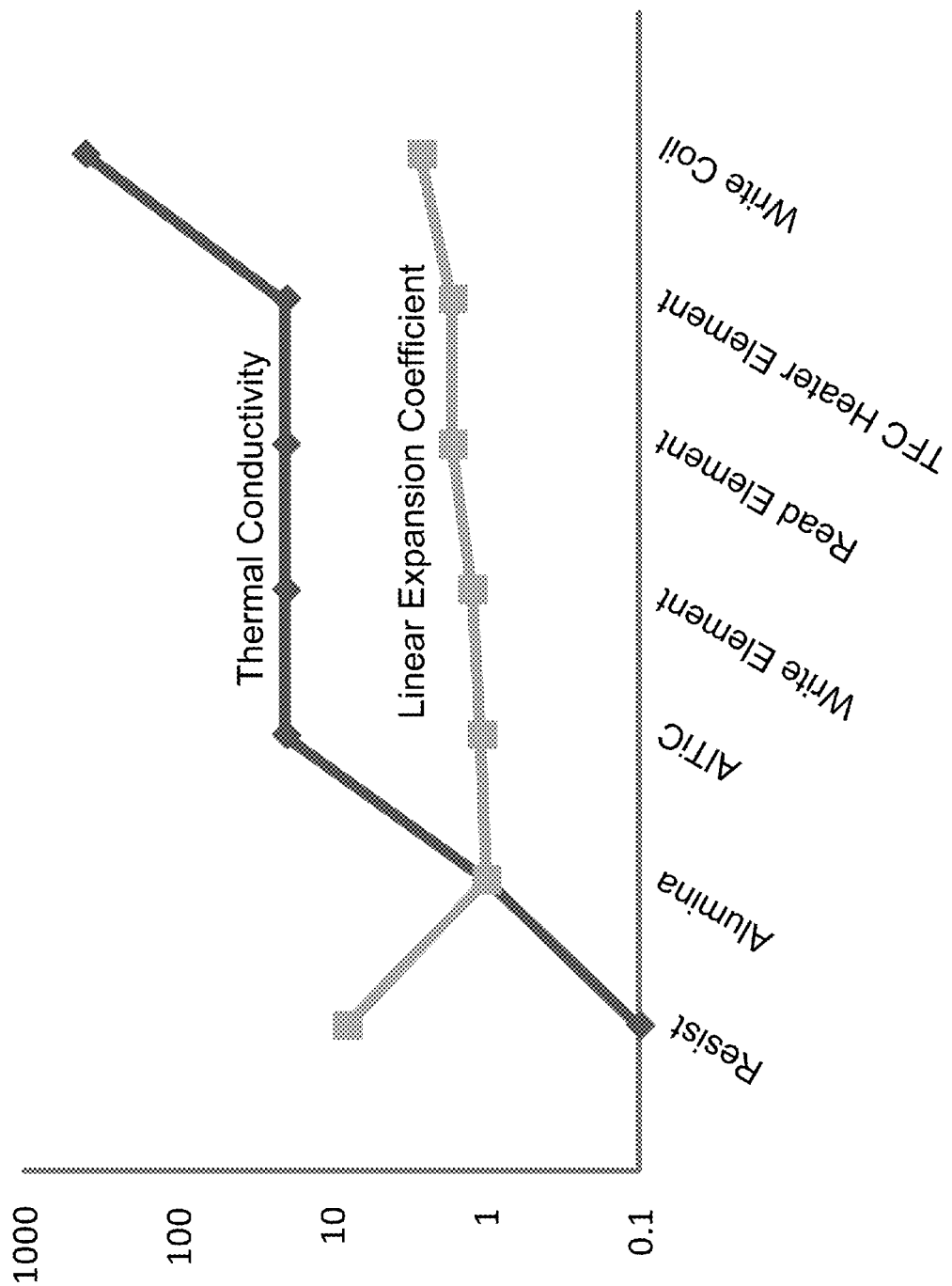
FIG. 7 shows a comparison, for various materials and elements in a magnetic head, of a thermal expansion coefficient and thermal conductivity.

FIG. 7 shows a comparison, for various materials and elements in a magnetic head, of a liner expansion coefficient (which is proportional to thermal expansion) and thermal conductivity, with alumina ($Al_2O_3$) being used as a reference. The magnetic head for this comparison has a structure where a coil, which generates heat during magnetic disk write operations, is enclosed by a resist serving as an insulation layer, and is further enclosed by alumina and a write element forming a magnetic circuit around the coil. Heat generated by the coil is transmitted to the resist, but the resist is a poor conductor of heat and readily undergoes thermal expansion. Consequently, heat is stored in the coil and the resist portion. The ABS component of the resist, which expands due to the stored heat, causes a write protrusion.

In one embodiment, AlTiC may be used for a substrate of the magnetic head. AlTiC is characterized by having a good balance between good thermal conductivity and low linear expansion, as shown in FIG. 7. When AlTiC is used as the substrate for the magnetic head, it also has a large thermal capacity because it has a large volume in comparison with the other elements and materials in the magnetic head.

In the first embodiment, where a magnetic head has write protrusion suppressed by causing heat generated by a magnetic disk write element during a write operation to be transferred to an AlTiC material, the write element may be formed in a layer near to the AlTiC substrate (by "near to," what is meant is as close as possible without shorting of the write circuit). In one embodiment, this may be accomplished by forming the write element in a layer closer to the AlTiC material than a layer comprising the read element.

Figure 8A:
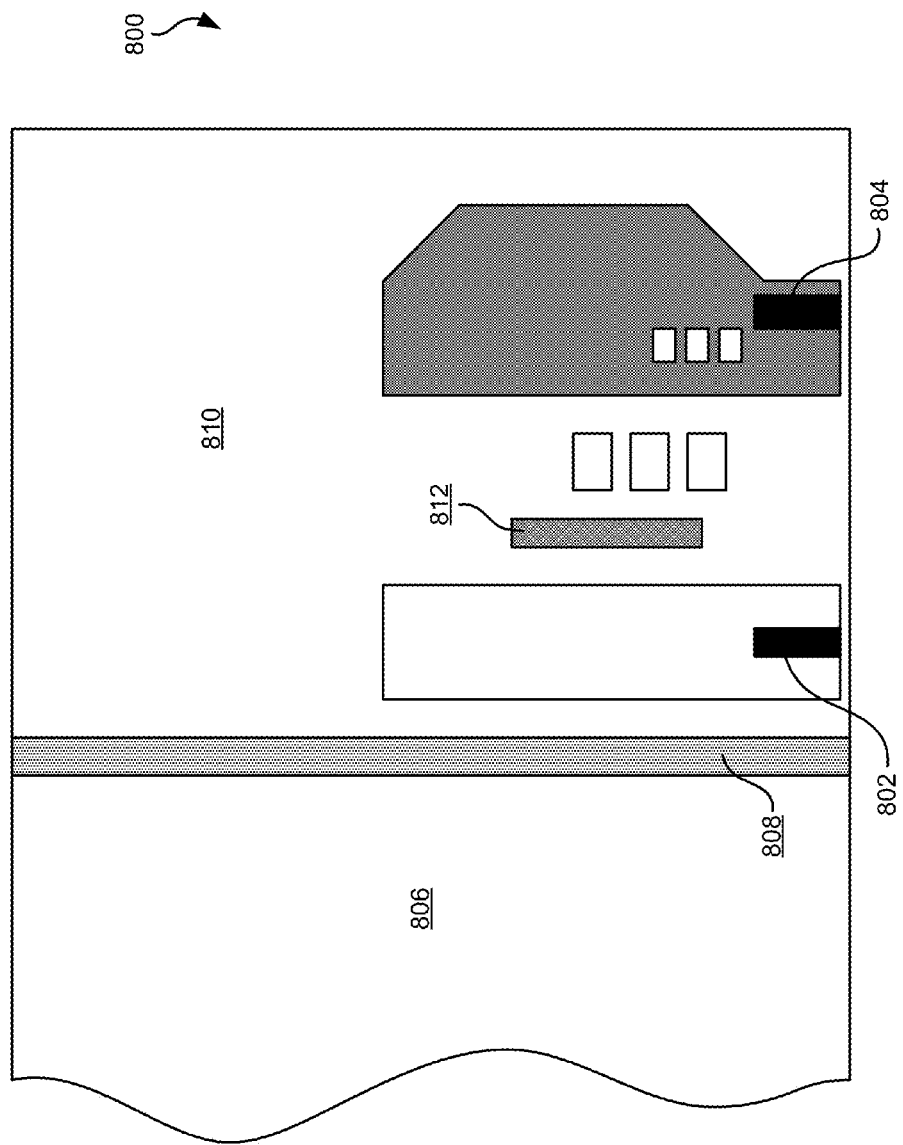
FIGS. 8A-8B show magnetic head structures according to the prior art.

Now referring to FIG. 8A, a conventional magnetic head 800 structure is shown according to the prior art. In this magnetic head 800, the read element 802 is formed conventionally in a layer near to the substrate 806 (separated therefrom by a dielectric layer 808, which may be a base alumina layer) while the write element 804 is formed in a layer farther from the substrate 806. The write element 804 and the read element 802 are formed in layers within a structure 810 comprising a dielectric material, such as alumina or some other suitable material. In some magnetic heads 800, a TFC heater element 812 may be provided for TFC.

Figure 9A:
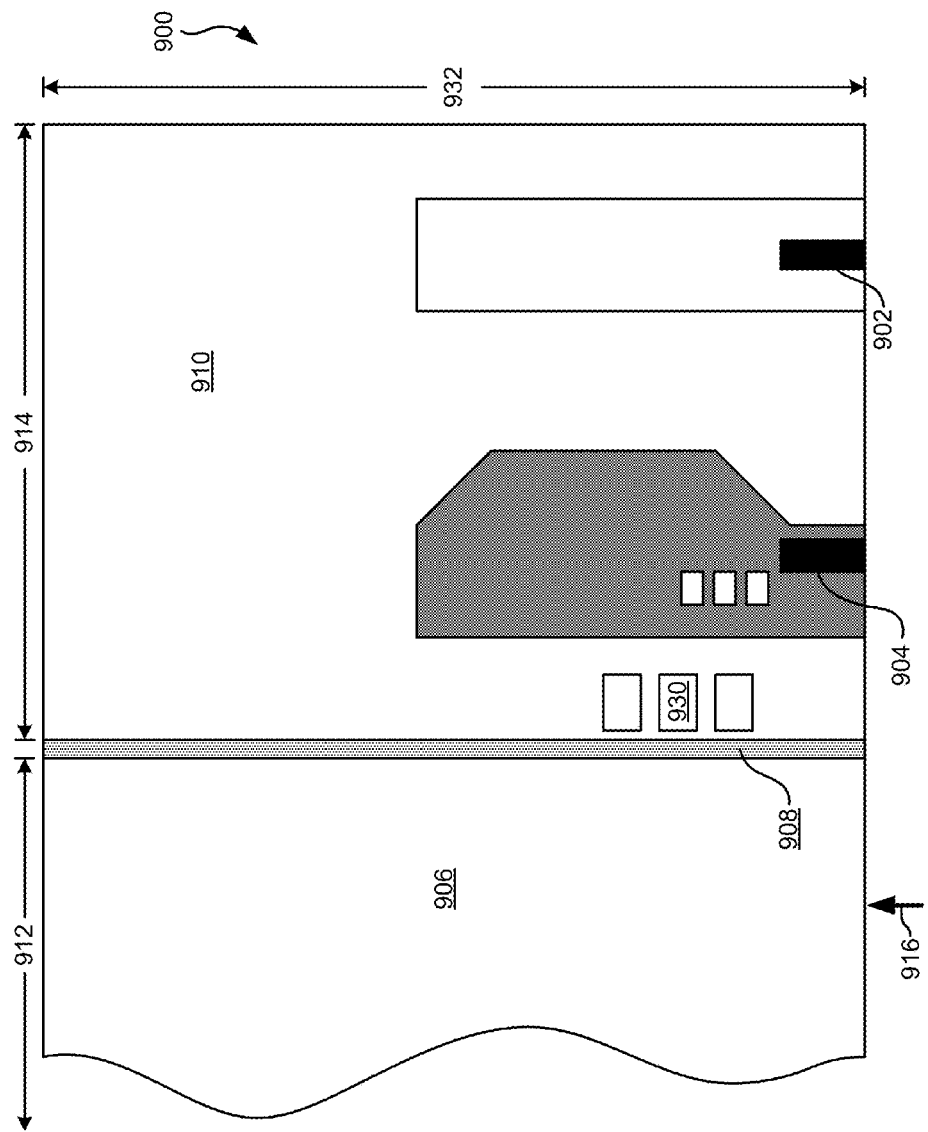
FIGS. 9A-9C show magnetic head structures according to various embodiments.

Now referring to FIG. 9A, a magnetic head 900 structure that provides for write protrusion suppression is shown according to one embodiment. In this magnetic head 900, the write element 904 is formed in a layer near to the substrate 906 (separated therefrom by a dielectric layer 908, which may be a base alumina layer), while the read element 902 is formed in a layer farther from the substrate 906. The substrate 906 comprises AlTiC or some other suitable material capable of dissipating heat produced by the write element 904 during a write operation transferred thereto, in order to suppress deformation of the head 900 caused by heat generated by the write element 904. The write element 904 and the read element 902 are formed in separate layers within a structure 910 comprising a dielectric material, such as alumina.

In one approach, the substrate 906 may be an alloy material having greater than about 50 at. % TiC, such as 60 at. %, 70 at. %, 80 at. %, 95 at. %, and substantially pure TiC, etc. By "about," what is meant is ±1% of the recited value. For example, "about 50 at. %" includes 49.5 at. % and 50.5 at. % and all values therebetween.

In one approach, the base dielectric layer 908 is the only layer positioned between the write element 904 and the substrate 906.

In another approach, the base dielectric layer 908 may be the only layer positioned between a portion of a coil 930 of the write element 904 and the substrate 906. In this embodiment, the base dielectric layer 908 may act as an insulator for coils 930 of the write element 904. This approach is particularly useful for write elements having a "barbershop" coil configuration.

In a further approach, the base dielectric layer 908 may separate a portion of a write coil 930 and coil insulation of the write element 904 from the substrate 906, with the base dielectric layer 908 being the only layer positioned between the substrate 906 and the portion of the coil 930/coil insulation.

In these descriptions, any seed layer, underlayer, adhesion layer, etc., that are used for formation of a pole, coil, or other structure or component of the write element 904 is considered to be part of the write element 904. Similarly, any seed layer, underlayer, adhesion layer, etc., that are used for formation of a pole, coil, or other structure or component of the read element 902 is considered to be part of the read element 902.

In one embodiment, this effect may be obtained by forming the write element 904 and the read element 902 in succession from the substrate 906, with various possible layers positioned therebetween.

FIG. 9A is not drawn to scale. In one approach, the AlTiC substrate 906 may have a width 912 that is ten times larger, or more, than a width 914 of the dielectric structure 910. In more approaches, the substrate width 912 may be 20 times, 30 times, 50 times, 100 times, or more larger than the dielectric width 914. Furthermore, the height 932 of the structures shown are also not to scale, as the write element 904 and read element 902 are positioned very close to the ABS 916 of the magnetic head 900, and are not near to the upper surface of the magnetic head 900.

Figure 9B:
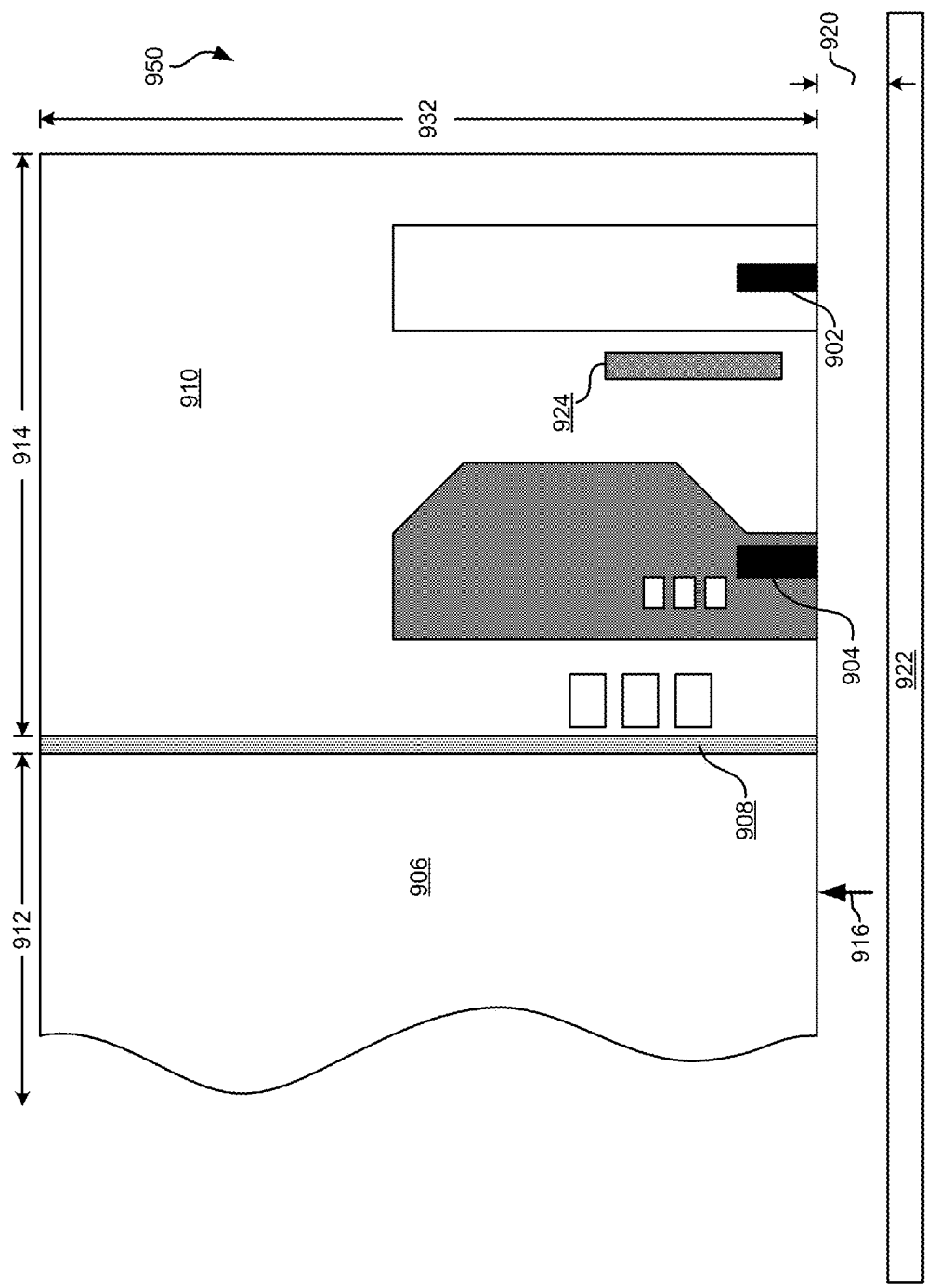

Referring now to FIG. 9B, according to the second embodiment, a magnetic head 950 may be adapted to provide TFC. In this embodiment, the magnetic head 950 is at least partially controlled by a controller, such as a TFC controller, adapted for controlling clearance 920 between the ABS 916 of the magnetic head 950 and a magnetic disk medium 922, the clearance changes being produced by thermal expansion due to heat from a TFC heater element 924. In one approach, the TFC heater element 924 may be positioned to effectively control the clearance 920 of the read element 902 and the write element 904 due to thermal expansion of materials near the TFC heater element 924 caused by heating of the TFC heater element 924. In one approach, the TFC heater element 924 may be positioned between the write element 904 and the read element 902 in a position that does not obstruct the conductance of heat generated by the write element 904 toward the AlTiC substrate material 906. In this way, the heat from the write element 904 during write operations is still transferred to the AlTiC substrate 906 to be dissipated while the heater element 924 may still control the clearance 920.

In one approach, the heater element 924 may be positioned directly in between the read element 902 and the write element 904 near the ABS 916. In another approach, the heater element 924 may be set farther back from the ABS 916.

In yet another approach, more than one TFC heater element 924 may be provided, with each heater element 924 being individually controllable to provide discrete heating to different portions of the magnetic head 950.

In one embodiment, this effect may be obtained by forming the write element 904 and the read element 902 in succession from the substrate 906, with various possible layers positioned therebetween.

FIG. 9B is not drawn to scale. In one approach, the AlTiC substrate 906 may have a width 912 that is ten times larger, or more, than a width 914 of the dielectric structure 910. In more approaches, the substrate width 912 may be 20 times, 30 times, 50 times, 100 times, or more larger than the dielectric width 914. Furthermore, the height 932 of the structures shown are also not to scale, as the write element 904 and read element 902 are positioned very close to the ABS 916 of the magnetic head 900, and are not near to the upper surface of the magnetic head 900.

Figure 8B:
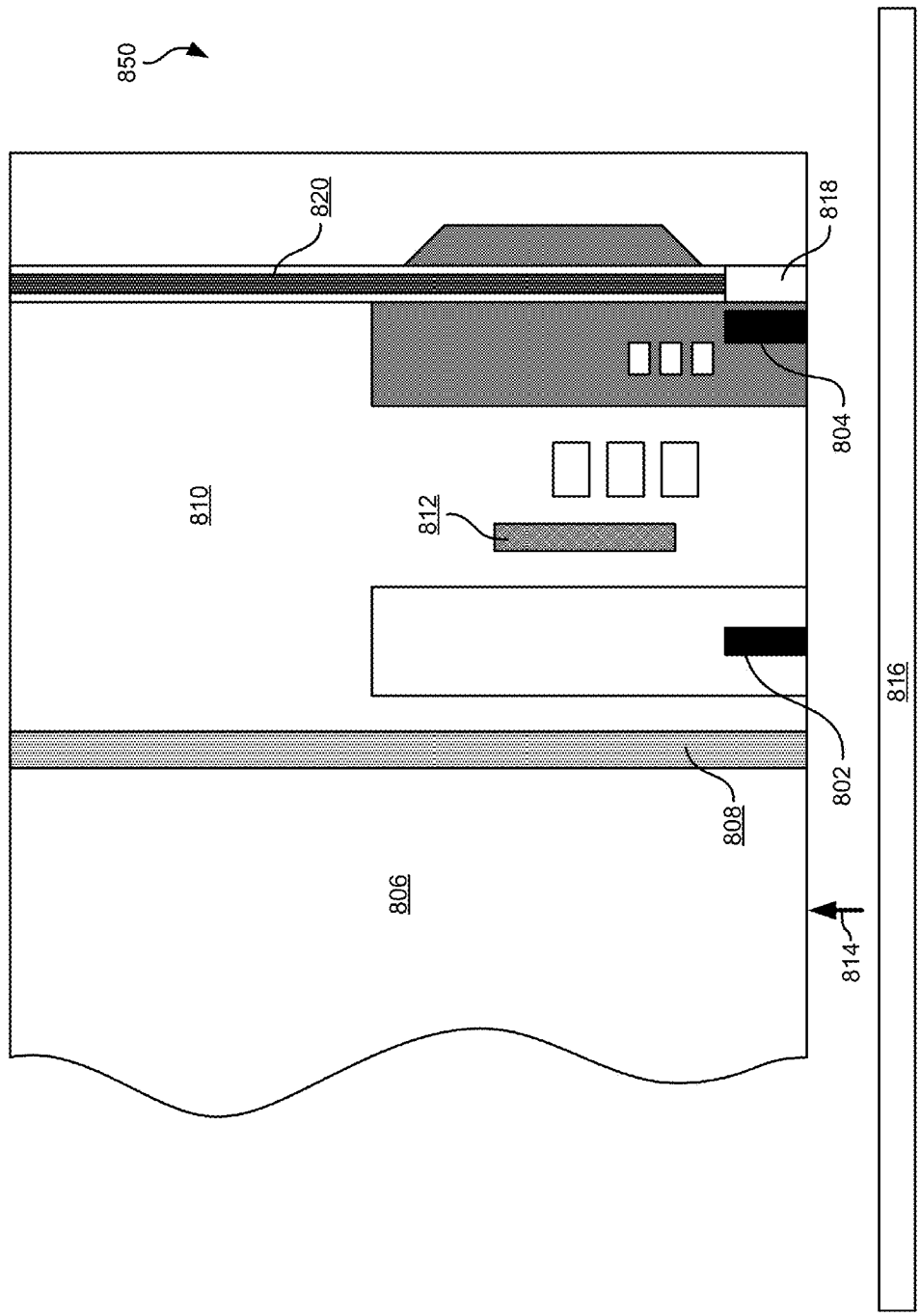

Now referring to FIG. 8B, a magnetic head 850 utilizing a thermal assist structure is shown according to the prior art. With thermal assistance, the disk medium 816 is heated by near field light produced by laser light that strikes a near field light generating element (also referred to herein as a near field transducer) 818 provided near the write element 804. This laser light reaches the near field transducer 818 via a laser light guide 820 passing through the write element 804, from the opposite surface thereof toward the ABS 814. For a magnetic head 850 that has a thermal assist structure, there is a risk of write protrusion due to expansion of materials caused by heat generated by the laser light guide 820 and heat generated by the near field transducer 818. Typically, these materials may be positioned at or near the ABS 814 and near to the laser light guide 820 and/or the near field transducer 818. In some approaches, the magnetic head 850 may include a heater element 812 for providing TFC.

Figure 9C:
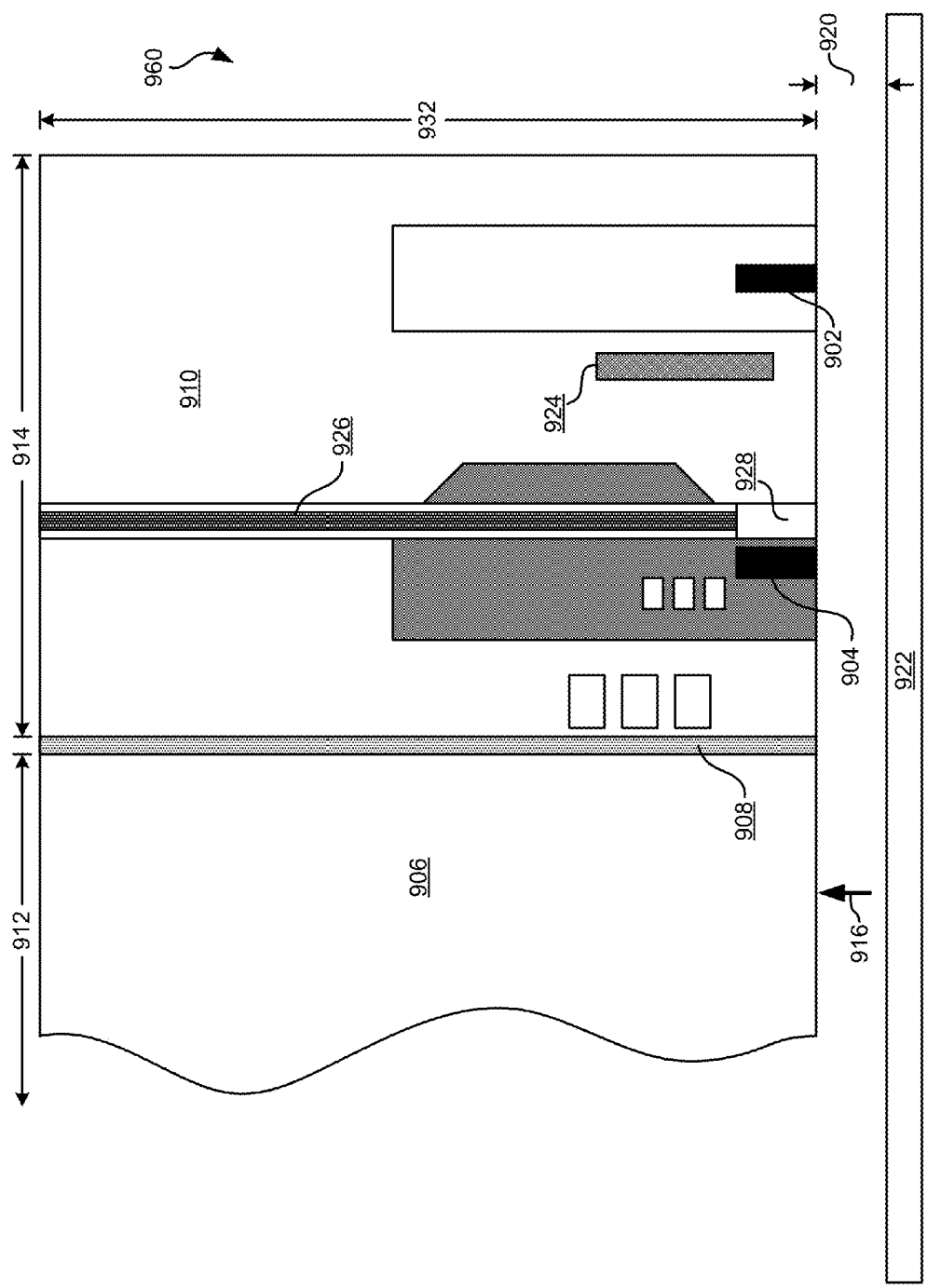

Now referring to FIG. 9C, a magnetic head 960 utilizing a thermal assist structure for suppressing write protrusion is shown according to the third embodiment. Write protrusion may be suppressed by causing heat generated by a laser light guide 926 and a near field light generating element (near field transducer) 928 to be transferred to the substrate 906, such as a substrate 906 comprising AlTiC.

Examples of thermal assist structures, which may be used with the structures described herein, are described in more detail in U.S. Pat. No. 8,169,881, issued May 1, 2012, which is herein incorporated by reference.

The heat generated by the laser light guide 926 and the near field light generating element 928 may be actively transferred onto the substrate 906 by positioning the laser light guide 926, the near field transducer 928, and the write element 904 in one or more layers near to the AlTiC substrate 906, with the read element 902 being positioned in a layer further from the AlTiC substrate 906 than the laser light guide 926, the near field transducer 928, and the write element 904.

In one embodiment, this effect may be obtained by forming the write element 904 and the read element 902 in succession from the substrate 906, with various possible layers positioned therebetween. In addition, the laser light guide 926 and near field transducer 928 may be formed in a layer closer to the AlTiC substrate 906, such as in a layer in which the write element 904 is formed, in order to cause heat generated thereby to be more actively transferred onto the AlTiC substrate 906 and as a result to suppress write protrusion.

This magnetic head 960 is designed such that the TFC heater element 924 is positioned so that it effectively controls the read element 902 and write element 904 protrusion amounts by thermal expansion of the materials near the heater element 924. In one approach, the heater element 924 may be positioned between the write element 904 and the read element 902 such that it does not obstruct the propagation of heat toward the AlTiC substrate 906 from the heater element 924 during write operations.

FIG. 9C is not drawn to scale. In one approach, the AlTiC substrate 906 may have a width 912 that is ten times larger, or more, than a width 914 of the dielectric structure 910. In more approaches, the substrate width 912 may be 20 times, 30 times, 50 times, 100 times, or more larger than the dielectric width 914. Furthermore, the height 932 of the structures shown are also not to scale, as the write element 904 and read element 902 are positioned very close to the ABS 916 of the magnetic head 900, and are not near to the upper surface of the magnetic head 900.

Magnetic head structures described herein according to various embodiments demonstrate advantages over prior art structures in terms of improved head characteristics and reliability due to more stable clearance between the ABS and the magnetic disk medium. This stable clearance is obtained, at least in part, through TFC that is augmented with suppression of write protrusion during magnetic disk write operations.

Figure 10A:
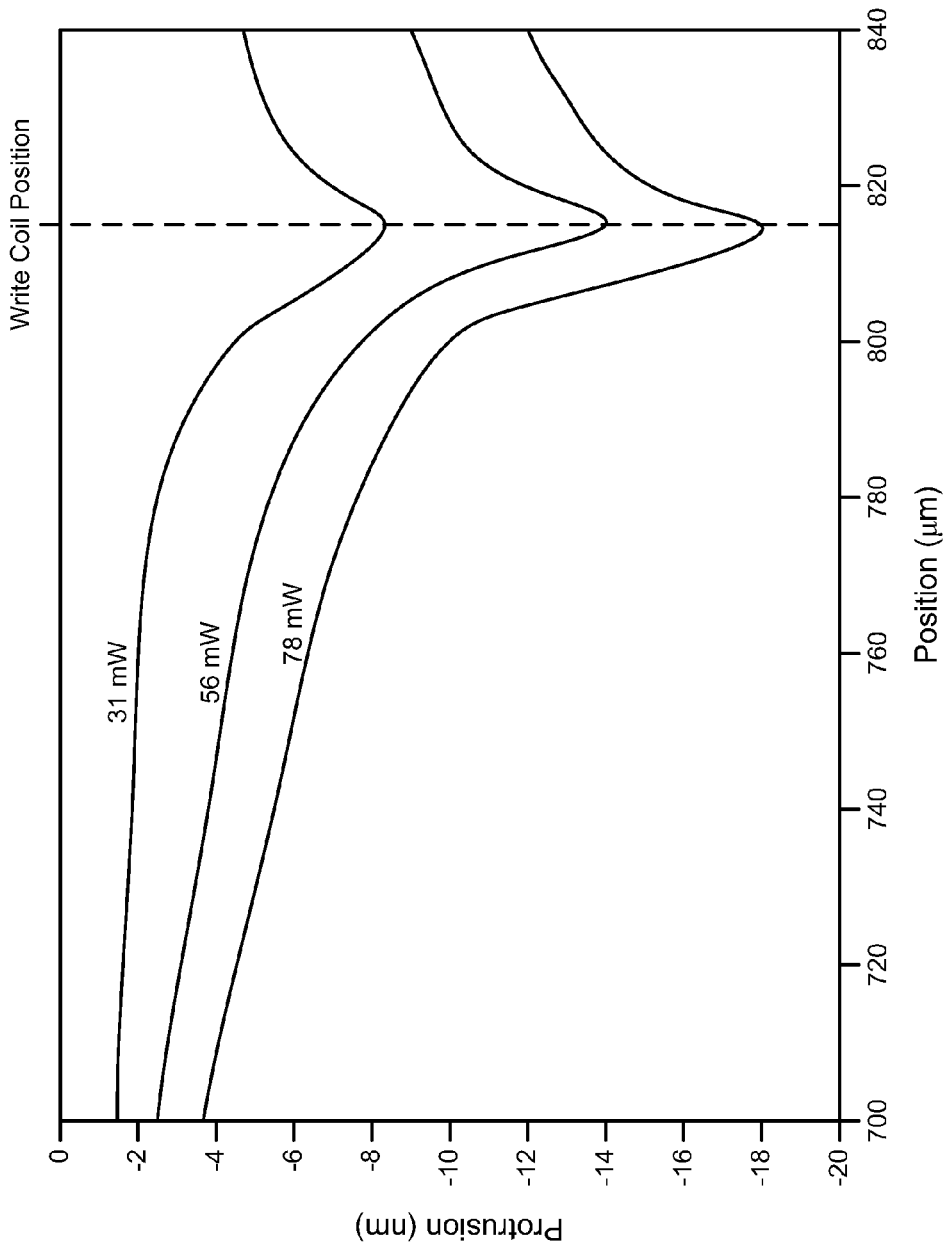
FIG. 10A shows write protrusion for a magnetic head structure according to the prior art.
Figure 10B:
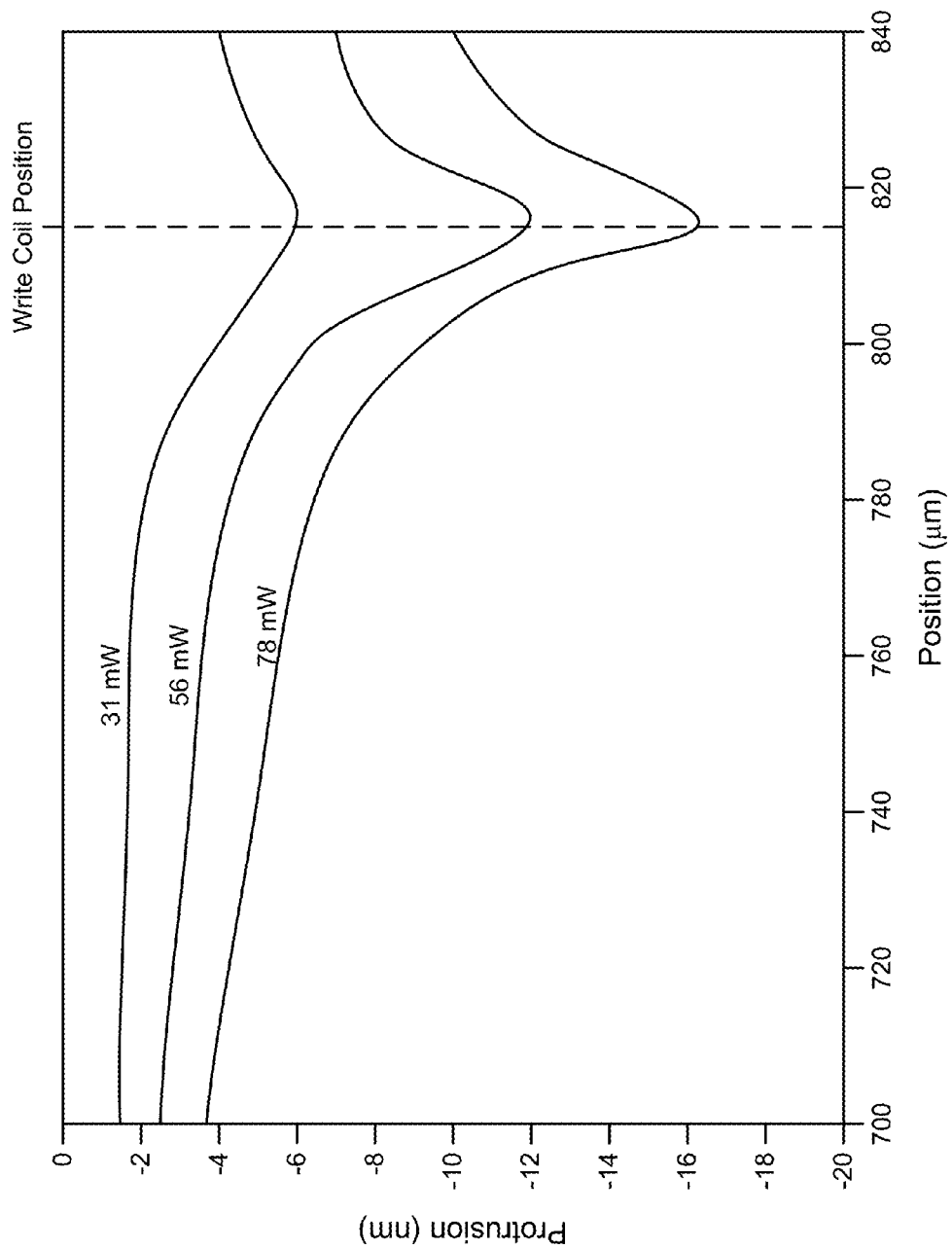
FIG. 10B shows write protrusion for a magnetic head structure according to one embodiment.

The head structures shown in FIGS. 8A and 9A were subjected to analysis of the thermal expansion caused by heat generated by a write coil and temperature distribution analysis through modeling calculations under the conditions shown in FIGS. 10A-10B.

Figure 11:
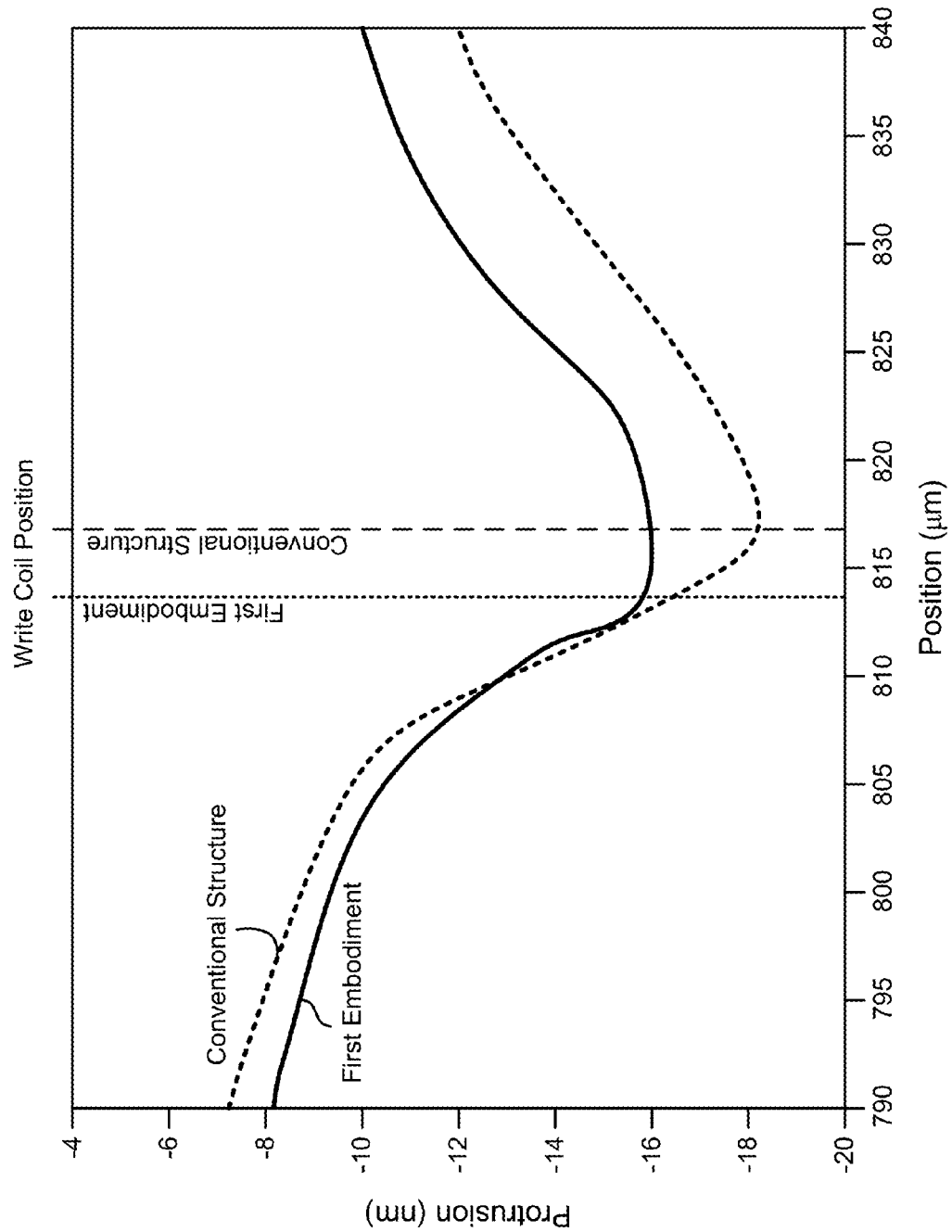
FIG. 11 shows a comparison of write protrusion in a structure according to one embodiment with write protrusion in a conventional structure.

FIG. 10A shows write protrusion in the conventional structure, while FIG. 10B shows write protrusion in the first embodiment. It was possible to confirm for both head structures that heat deformation commensurate with the amount of heat generated by the write coil occurred due to thermal expansion produced by write coil heat generation, with the write coil element being considered as the tip. However, it can also be seen that the amount of write protrusion in the structure of the first embodiment, as shown in FIG. 10B, is reduced when compared with the amount of write protrusion in the conventional structure, as shown in FIG. 10A FIG. 11 shows a comparison of write protrusion in the structure of the first embodiment with write protrusion in the conventional structure. When the amount of heat deformation of each head structure was compared under the same write coil heat generation conditions (write coil power=78 mW), a suppressing effect of about 2 nm, taking heat deformation as the tip, was observed for the head structure according to the first embodiment (having write protrusion suppression) compared with the conventional head structure. Furthermore, it was possible to confirm that the thermal expansion of the AlTiC substrate was greater in the head structure according to the first embodiment than in the conventional head structure due to heat transferred onto the AlTiC substrate.

Figure 12:
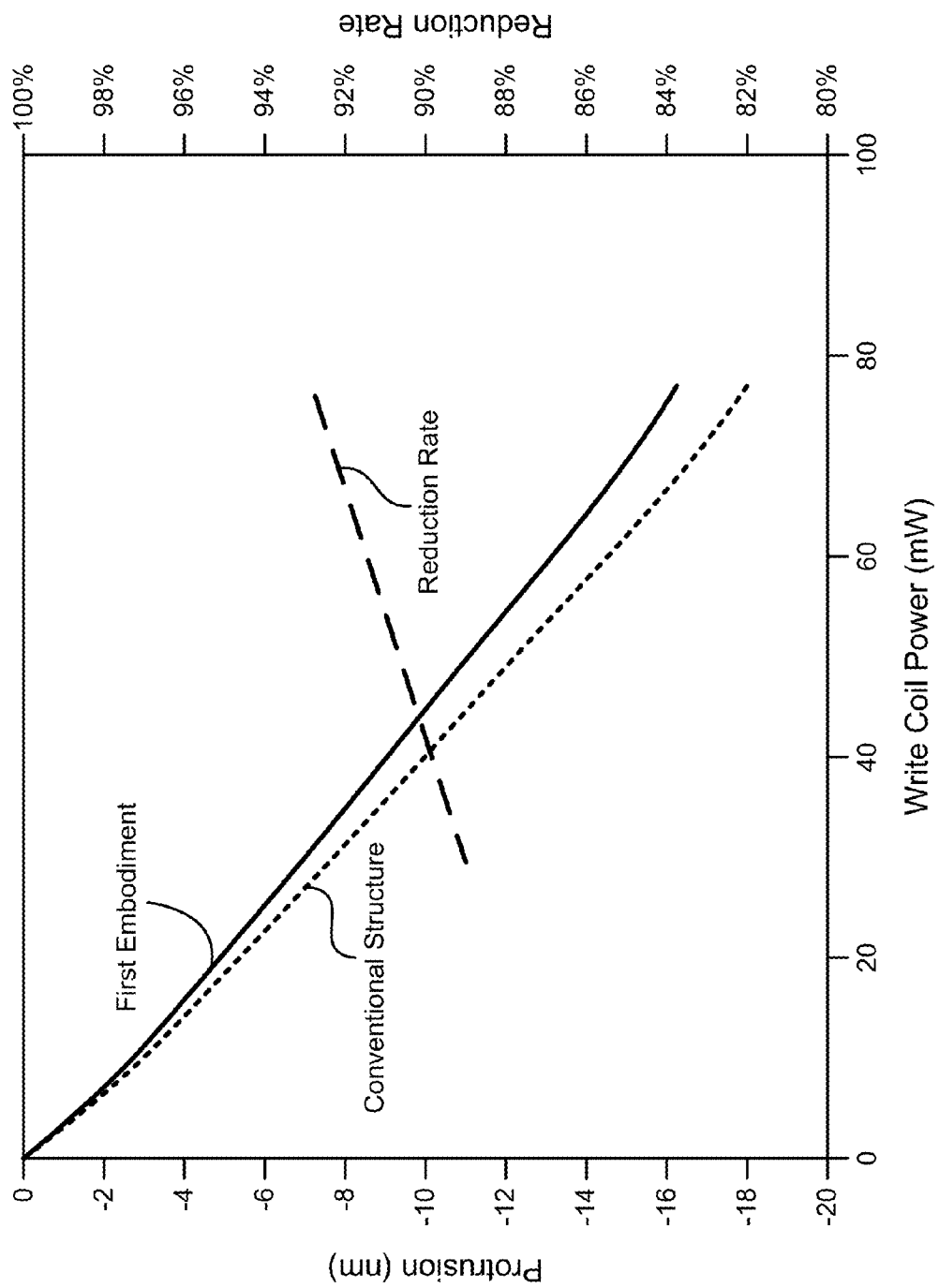
FIG. 12 shows a comparison of write protrusion in a structure according to one embodiment with write protrusion in a conventional structure.

With the models used in this confirmation, as shown in FIG. 12, it was possible to confirm a write protrusion suppressing effect of approximately 10% with the head structure according to the first embodiment compared with the conventional head structure. Furthermore, a method for reducing the thickness of the base dielectric layer (which may comprise alumina), which obstructs heat conductance to the AlTiC substrate, is also feasible with the head structure according to the first, second, and third embodiments, in order to obtain a greater write protrusion suppressing effect.

In addition, a comparison of heat distribution according to the head structure according to the first embodiment revealed more advantages. When the heat distribution of the head structure according to the first embodiment was compared to the conventional head structure under the same write coil heat generation conditions (write coil power=78 mW), it was possible to confirm an effect whereby the maximum value for generation of heat stored in the write coil portion was suppressed by about 8.2° C. (127.7° C.→119.5° C.), e.g., 127.7° for the conventional structure to 119.5° C. for the embodiments described herein. Furthermore, it was possible to confirm that the maximum value of heat radiation onto the AlTiC substrate was increased by 7.2° C. (51.0° C.→58.2° C.). Moreover, there was enhanced performance in terms of the amount of heat generated by the write coil which was transferred onto the AlTiC substrate in the head structures described herein, because the thickness of the base dielectric layer between the write element and the AlTiC substrate was reduced, and the write protrusion suppressing effect was enhanced.

Figure 13:
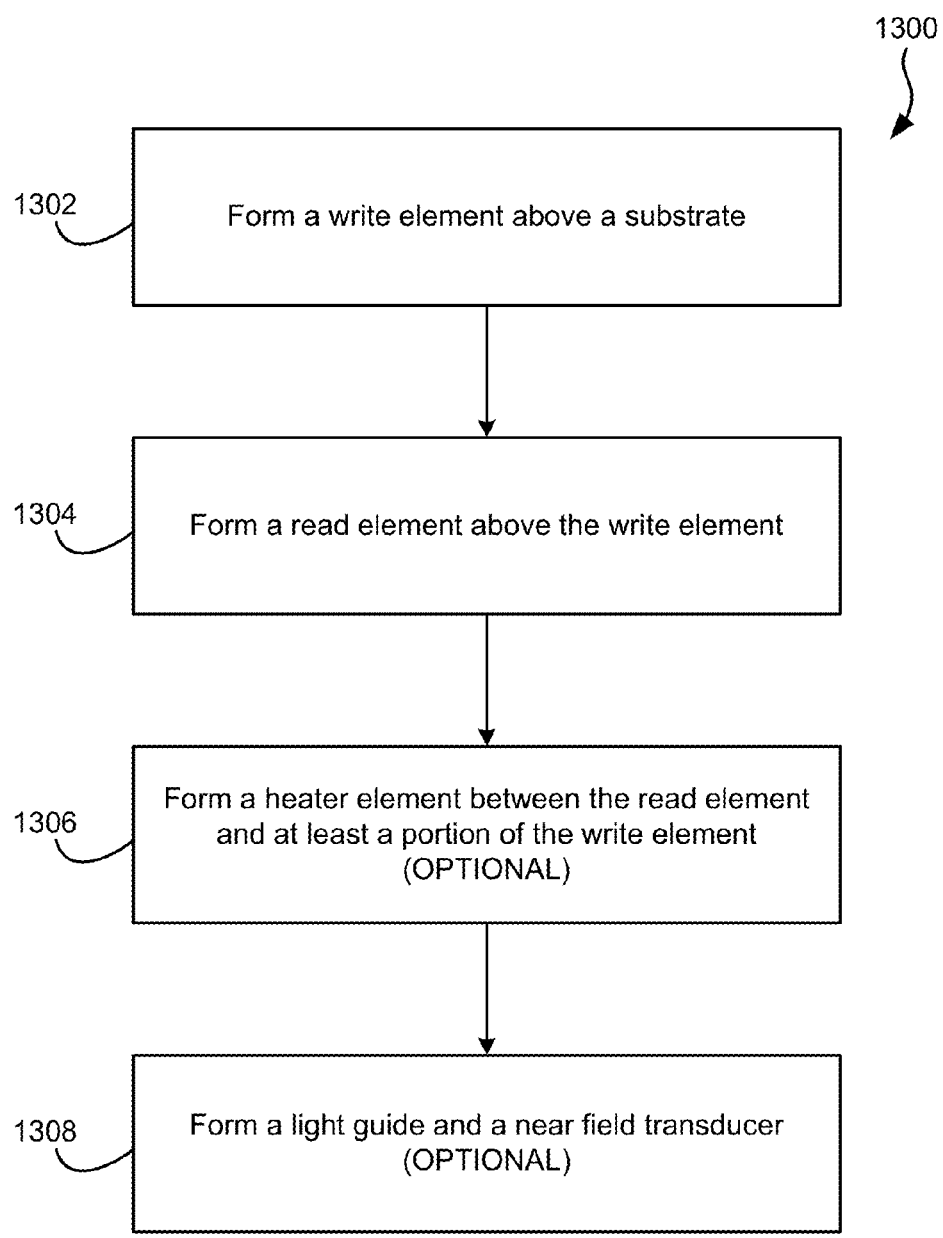
FIG. 13 is a flowchart of a method, according to one embodiment.

FIG. 13 shows a method 1300 for forming a magnetic head capable of suppressing write protrusion in accordance with one embodiment. As an option, the present method 1300 may be implemented to construct structures such as those shown in FIGS. 1-12. Of course, however, this method 1300 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

In operation 1302, a write element is formed above a substrate using any known formation process, such as sputtering, plating, etc. In one embodiment, a dielectric layer may be formed between the write element and the substrate, with the dielectric layer being the only layer positioned therebetween. The dielectric layer may be alumina, MgO, or some other suitable material.

In one embodiment, the substrate may include a material capable of dissipating heat, such as an alloy material comprising greater than about 50 at. % TiC.

In operation 1304, a read element is formed above the write element using any known formation process, such as sputtering, plating, etc.

In this way, the write element is positioned closer to the substrate than the read element.

In optional operation 1306, a heater element is formed between the read element and at least a portion of the write element, the heater element being adapted for inducing protrusion of an ABS of the magnetic head during a write operation.

In optional operation 1308, a light guide and a near field transducer are formed. The light guide and the near field transducer are formed between the substrate and the write element, between the substrate and the write element, or between poles of the write element.

It should be noted that methodology presented herein for at least some of the various embodiments may be implemented, in whole or in part, in computer hardware, software, by hand, using specialty equipment, etc., and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
   a write element;
   a read element;
   a substrate configured to dissipate heat generated by the write element during write operations;
   a near field transducer positioned between the read element and one or more coils of the write element; and
   a laser light guide positioned above the near field transducer in an element height direction,
   wherein the write element is positioned nearer to the substrate than the read element.

2. The magnetic head as recited in claim 1, wherein the substrate is an alloy material having greater than about 80 at. % TiC.

3. The magnetic head as recited in claim 1, further comprising a heater element positioned between the read element and the write element, the heater element being configured to induce protrusion of portions of an air bearing surface (ABS) of the magnetic head to adjust a clearance between the portions of the ABS and a magnetic medium.

4. The magnetic head as recited in claim 3, further comprising a controller for controlling operation of the heater element to adjust the clearance in order to provide thermal flying-height control (TFC) for the magnetic head.

5. The magnetic head as recited in claim 1,
   wherein the laser light guide is configured to direct laser light from a light source to the near field transducer, and
   wherein the near field transducer is configured to cause heating of a portion of a magnetic medium during a write operation.

6. The magnetic head as recited in claim 5, wherein the laser light guide, the near field transducer, and the write element are positioned nearer to the substrate than the read element.

7. The magnetic head as recited in claim 5, wherein the laser light guide and the near field transducer are positioned between poles of the write element.

8. The magnetic head as recited in claim 1, further comprising a dielectric layer separating the write element from the substrate, the dielectric layer being the only layer positioned between the write element and the substrate.

9. The magnetic head as recited in claim 1, further comprising a dielectric layer separating a portion of a coil of the write element from the substrate, the dielectric layer being the only layer positioned between the portion of the coil of the write element and the substrate.

10. A magnetic data storage system, comprising:
at least one magnetic head as recited in claim 1;
a magnetic medium;
a drive mechanism for passing the magnetic medium over the at least one magnetic head; and
a controller electrically coupled to the at least one magnetic head for controlling operation of the at least one magnetic head.

11. A system, comprising:
at least one magnetic head, each magnetic head comprising:
a write element;
a read element;
a substrate, the substrate being an alloy material having greater than about 50 at. % TiC, wherein the write element is positioned nearer to the substrate than the read element such that heat generated by the write element during write operations is dissipated by the substrate; and
a heater element positioned between the read element and the write element;
a magnetic medium;
a drive mechanism for passing the magnetic medium over the at least one magnetic head; and
a controller electrically coupled to the at least one magnetic head for controlling operation of the at least one magnetic head,
wherein the heater element is configured to induce protrusion of portions of an air bearing surface (ABS) of the magnetic head to adjust a clearance between the portions of the ABS and the magnetic medium.

12. The system as recited in claim 11, wherein at least one of the magnetic heads further comprises:
a laser light guide; and
a near field transducer positioned between the read element and at least a portion of the write element,
wherein the laser light guide is configured to direct laser light from a light source to the near field transducer, and
wherein the near field transducer is configured to cause heating of a portion of a magnetic medium during a write operation.

13. The system as recited in claim 12, wherein the laser light guide, the near field transducer, and the write element are positioned nearer to the substrate than the read element.

14. The system as recited in claim 12, wherein the laser light guide and the near field transducer are positioned between poles of the write element.

15. The system as recited in claim 12, wherein a write coil is wrapped around the laser light guide and the near field transducer.

16. The system as recited in claim 11, further comprising a dielectric layer separating the write element from the substrate, the dielectric layer being the only layer positioned between the write element and the substrate.

17. The system as recited in claim 11, further comprising a dielectric layer separating a portion of a coil of the write element from the substrate, the dielectric layer being the only layer positioned between the portion of the coil of the write element and the substrate.

18. A method for forming a magnetic head, the method comprising:
forming a write element above a substrate, the substrate comprising an alloy material configured to dissipate heat from the write element during a write operation;
forming a read element above the write element; and
forming at least one of:
a heater element between the read element and the write element; and
a near field transducer coupled to a laser light guide, the near field transducer being positioned between the read element and one or more coils of the write element.

19. The method as recited in claim 18, wherein the alloy material has greater than about 80 at. % TiC.

20. The method as recited in claim 18, wherein the heater element is configured to induce protrusion of an air bearing surface (ABS) of the magnetic head during a write operation.

21. The method as recited in claim 18, wherein the laser light guide is positioned above the near field transducer in an element height direction.

* * * * *